US011969866B2

(12) United States Patent
Li

(10) Patent No.: US 11,969,866 B2
(45) Date of Patent: Apr. 30, 2024

(54) MANUAL CLAMP

(71) Applicants: HANGZHOU UNITED TOOLS CO., LTD., Hangzhou (CN); HANGZHOU GREAT STAR INDUSTRIAL CO., LTD., Hangzhou (CN)

(72) Inventor: Yueming Li, Hangzhou (CN)

(73) Assignees: HANGZHOU UNITED TOOLS CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 293 days.

(21) Appl. No.: 17/427,356

(22) PCT Filed: Jan. 22, 2020

(86) PCT No.: PCT/CN2020/073715
§ 371 (c)(1),
(2) Date: Jul. 30, 2021

(87) PCT Pub. No.: WO2020/156411
PCT Pub. Date: Aug. 6, 2020

(65) Prior Publication Data

US 2022/0097211 A1 Mar. 31, 2022

(30) Foreign Application Priority Data

Feb. 1, 2019 (CN) ......................... 201920183579.8

(51) Int. Cl.
*B25B 5/02* (2006.01)
*B25B 5/08* (2006.01)

(52) U.S. Cl.
CPC ................ *B25B 5/02* (2013.01); *B25B 5/082* (2013.01)

(58) Field of Classification Search
CPC ............ B25B 5/02; B25B 5/082; B25B 5/085
See application file for complete search history.

(56) References Cited

U.S. PATENT DOCUMENTS 6,676,120 B1 * 1/2004 Hallbeck ................. B25B 5/068 269/6
7,040,609 B1 * 5/2006 Liou ....................... B25B 5/068 269/6
(Continued)

FOREIGN PATENT DOCUMENTS

CN 201030521 Y 3/2008
CN 201128118 Y 10/2008
(Continued)

OTHER PUBLICATIONS

PCT; App. No. PCT/CN2020/073715; International Search Report and Written Opinion dated Apr. 22, 2020.

*Primary Examiner* — Seahee Hong
(74) *Attorney, Agent, or Firm* — Fitch, Even, Tabin & Flannery, LLP

(57) ABSTRACT

A manual clamp, comprising: a sliding rod; a fixed clamp body fixed at one end of the sliding rod; a movable clamp body sliding on the sliding rod; a movable clamp head sliding on the movable clamp body; a handle rotationally connected to the movable clamp body; a cam portion provided at one end, close to the movable clamp head, of the handle, wherein when the handle is operated, the cam portion comes into contact with the movable clamp head and drives the movable clamp head to move toward the fixed clamp body to realize clamping, or the cam portion disengages from the movable clamp head to realize loosening; and a locking device configured to lock a position of the handle or unlock the handle by releasing the locking device. The manual clamp may realize clamping by pulling the handle once when clamping an object, thereby improving the efficiency.

20 Claims, 5 Drawing Sheets

(56) References Cited

U.S. PATENT DOCUMENTS

| | | | | |
|---|---|---|---|---|
| 7,168,181 | B2 * | 1/2007 | Walchak | B25B 5/163 269/36 |
| 7,222,842 | B2 * | 5/2007 | Lin | B25B 5/085 269/166 |
| 7,530,556 | B1 * | 5/2009 | Zheng | B25B 5/085 269/166 |
| 7,735,813 | B2 * | 6/2010 | Geier | F16C 1/18 269/95 |
| 9,328,751 | B1 * | 5/2016 | Liu | F16B 2/12 |
| 2008/0136077 | A1 * | 6/2008 | Yang | B25B 5/127 269/6 |
| 2010/0084799 | A1 * | 4/2010 | Wong | B25B 5/085 269/214 |
| 2011/0271502 | A1 | 11/2011 | Legler et al. | |
| 2015/0174737 | A1 * | 6/2015 | Chen | B25B 5/085 269/216 |

FOREIGN PATENT DOCUMENTS

| | | | |
|---|---|---|---|
| CN | 201179627 | Y | 1/2009 |
| CN | 201415368 | Y | 3/2010 |
| CN | 201702703 | U | 1/2011 |
| CN | 103659633 | A | 3/2014 |
| CN | 204195573 | U | 3/2015 |
| CN | 207669161 | U | 7/2018 |
| CN | 209566035 | U | 11/2019 |
| DE | 102009000153 | B3 | 7/2010 |
| WO | 2017156816 | A1 | 9/2017 |

* cited by examiner

MANUAL CLAMP

FIELD OF THE INVENTION

The present application relates to the field of manual tools, and in particular to a manual clamp.

DESCRIPTION OF THE PRIOR ART

The "F" type clamp is a commonly used manual clamp, such as an "F-clamp" (document 1) disclosed in the Chinese utility model patent granted a publication No. CN 204195573 U, and a "fast F-clamp" (document 2) disclosed in the Chinese utility model patent granted a publication No. CN 207669161 U. The "F-clamp" in document 1 requires turning a handle several times when clamping, which is inefficient; and the "fast F-clamp" in document 2 requires holding a fixing handle and a wrench several times when clamping, which also has a defect of low efficiency and its structure is complex.

Therefore, those skilled in the art devote themselves to developing an "F" type manual clamp, which has a high clamping efficiency and a simple structure.

SUMMARY OF THE INVENTION

In view of the above-mentioned shortcomings of the prior art, the technical problem to be solved by the present application is to provide an "F" type manual clamp, which has a high clamping efficiency and a simple structure.

To achieve the above-mentioned purpose, the present application provides a manual clamp, comprising: a sliding rod; a fixed clamp body which is fixedly connected to one end of the sliding rod; a movable clamp body which is removably connected to the sliding rod; a movable clamp head which is removably connected to the movable clamp body; a handle which is rotationally connected to the movable clamp body; a cam portion which is provided at one end, close to the movable clamp head, of the handle and is configured to come into contact with or disengage from the movable clamp head by operating the handle, and the cam portion being further configured to exert a driving force to the movable clamp head through the contact with the movable clamp head, thus being able to drive the movable clamp head to move toward the fixed clamp body to realize clamping; and a locking device which is configured to fix a position of the handle when clamping.

In some embodiments, optionally, the locking device comprises: a ratchet which is provided on the movable clamp body; a pawl which is matched with the ratchet and is provided on the handle; an elastic element which is configured to exert an elastic force to the pawl, such that the pawl meshes with the ratchet; and an unlocking component which is configured to be operated to overcome the elastic force of the elastic element, such that the pawl is out of mesh with the ratchet.

In some embodiments, optionally, the handle comprises a first side plate and a second side plate which are oppositely provided, and a reinforcing member fixed between the first side plate and the second side plate; and the first side plate and the second side plate are respectively located on both sides of the movable clamp body and are connected to the movable clamp body through a pin shaft.

In some embodiments, optionally, the pawl is provided within a space enclosed by the first side plate, the second side plate and the reinforcing member, and the pawl is connected to the first side plate and the second side plate through a pin shaft.

In some embodiments, optionally, the unlocking component comprises a pawl sheath fixedly connected to the pawl, and the elastic element is configured to exert an elastic force to the pawl sheath.

In some embodiments, optionally, at least a part of the pawl sheath is located outside the handle.

In some embodiments, optionally, the elastic element comprises a spring.

In some embodiments, optionally, the pawl sheath is provided with a recessed hole, the spring is located in the recessed hole, one end of the spring is connected to the pawl sheath, and the other end is connected to the reinforcing member.

In some embodiments, optionally, the ratchet and the movable clamp body are formed integrally.

In some embodiments, optionally, the ratchet is independent of the movable clamp body, and the ratchet is fixedly mounted on the movable clamp body.

In some embodiments, optionally, the movable clamp head comprises a first part and a second part which are symmetrically provided and at least one pair of sliding slots, wherein the at least one pair of sliding slots are respectively provided on the first part and the second part, and a guide pin on the movable clamp body is sheathed in at least one pair of sliding slots respectively.

In some embodiments, optionally, the movable clamp head is provided with two pairs of sliding slots, and at least two guide pins on the movable clamp body are sheathed in the two pairs of sliding slots respectively.

In some embodiments, optionally, the movable clamp body is provided with two positioning pins, and the two positioning pins are configured to come into contact with the sliding rod when clamping.

In some embodiments, optionally, the fixed clamp body is fixed on the sliding rod through a first pin.

In some embodiments, optionally, the fixed clamp body is also provided with a second pin, and the second pin comes into contact with the sliding rod when clamping.

In some embodiments, optionally, the fixed clamp body and the sliding rod are formed integrally.

In some embodiments, optionally, a limit pin is provided at one end, away from the fixed clamp body, of the sliding rod.

In some embodiments, optionally, the fixed clamp body is provided with a first sheath, and/or the movable clamp head is provided with a second sheath.

In another aspect, the present application also provides a manual clamp, comprising: a sliding rod; a fixed clamp body which is fixedly connected to one end of the sliding rod; a movable clamp body which is removably connected to the sliding rod; a movable clamp head which is removably connected to the movable clamp body; a handle which is rotationally connected to the movable clamp body, wherein the handle comprises a first side plate and a second side plate which are oppositely provided, and a reinforcing member fixed between the first side plate and the second side plate, wherein the first side plate and the second side plate are respectively located on both sides of the movable clamp body and are connected to the movable clamp body through a first pin shaft; a cam portion which is provided at one end, close to the movable clamp head, of the handle and is configured to come into contact with or disengage from the movable clamp head by operating the handle, and the cam portion being further configured to exert a driving force to the movable clamp head through the contact with the movable clamp head, thus being able to drive the movable clamp head to move toward the fixed clamp body to realize clamping; a ratchet which is provided on the movable clamp body; a pawl which is matched with the ratchet and is rotationally provided between the first side plate and the second side plate; an elastic element which is configured to exert an elastic force to the pawl, such that the pawl meshes with the ratchet; and a pawl sheath which is connected to the pawl and is configured to be operated to overcome the elastic force of the elastic element, such that the pawl is out of mesh with the ratchet.

In some embodiments, optionally, the movable clamp head comprises a first part and a second part which are oppositely provided and at least two pairs of sliding slots, wherein the at least two pairs of sliding slots are respectively provided on the first part and the second part, and at least two guide pins on the movable clamp body are sheathed in the at least two pairs of sliding slots respectively.

The manual clamp of the present application has a simple structure, and when the fixed clamp body and the movable clamp body come into contact with a clamped object, the clamping can be realized by pulling the handle once, thereby improving the efficiency. In addition, the handle consists of two side plates and a reinforcing member, which not only ensures structural requirements for the handle, but also enhances the strength and reduces the manufacturing cost. The movable clamp head is provided with two pairs of sliding slots, such that the movable clamp head can be guided when clamping, so as to avoid tilting of the movable clamp head.

Figure 1:
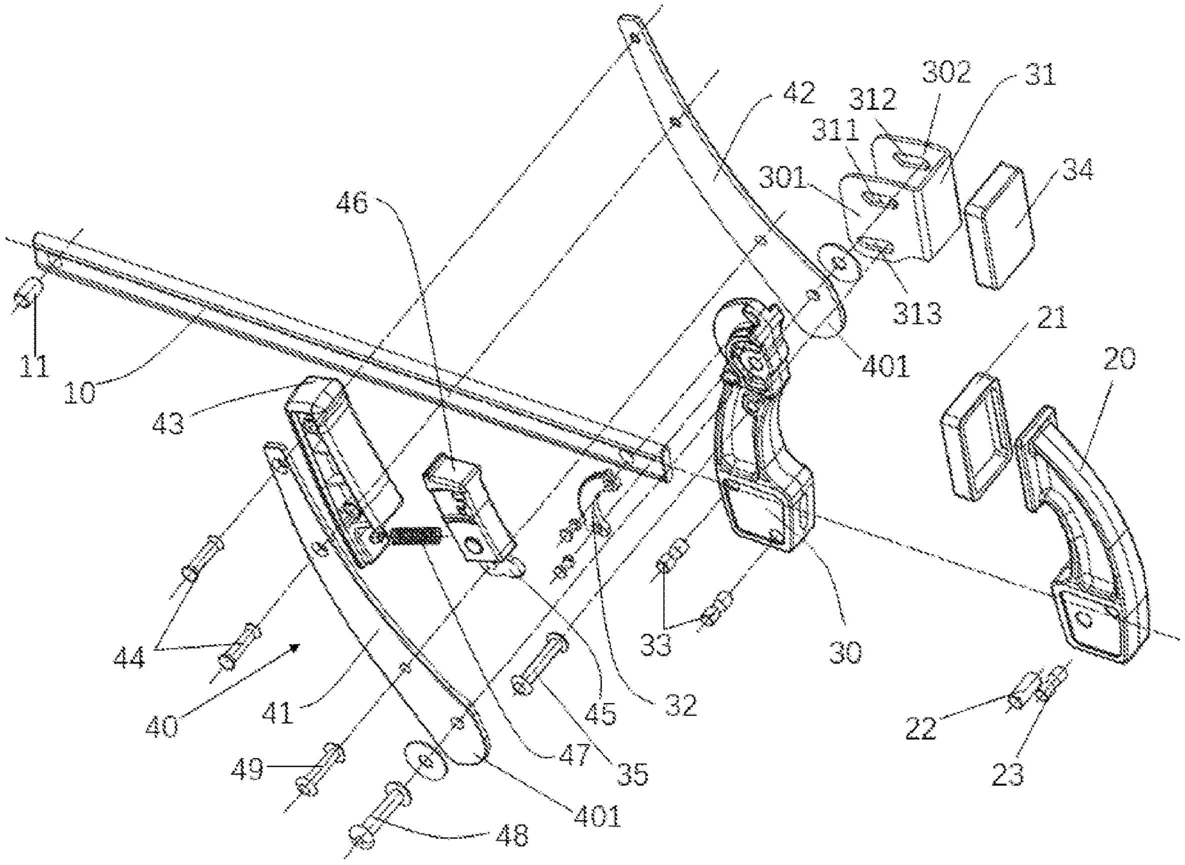
FIG. 1 is an exploded view of a manual clamp.

10—sliding rod, 11—limit pin, 20—fixed clamp body, 21—first sheath, 22—first pin, 23—second pin, 30—movable clamp body, 31—movable clamp head, 301—first part, 302—second part, 311—first sliding slot, 312—second sliding slot, 313—third sliding slot, 314—fourth sliding slot, 32—ratchet, 33—positioning pin, 34—second sheath, 35—second guide pin, 40—control handle, 401—cam portion, 41—first side plate, 42—second side plate, 43—reinforcing member, 44—rivet, 45—pawl, 46—pawl sheath, 461—recessed hole, 47—elastic element, 48—first pin shaft, 49—second pin shaft.

DETAILED DESCRIPTION OF THE PREFERRED EMBODIMENTS

Hereinafter, a plurality of preferred embodiments of the present application will be introduced with reference to the drawings attached to the specification, so that the technical content will be clearer and easier to understand. The present application can be embodied in many different forms of embodiments, and the scope of protection of the present application is not limited to the embodiments mentioned herein.

In the drawings, components with the same structure are represented by the same numerals, and components with similar structures or functions are represented by similar numerals. The size and thickness of each component shown in the drawings are arbitrarily shown, and the size and thickness of each component are not limited in the present application. In order to make the illustration clearer, the thicknesses of the components are appropriately exaggerated in some places in the drawings.

Figure 2:
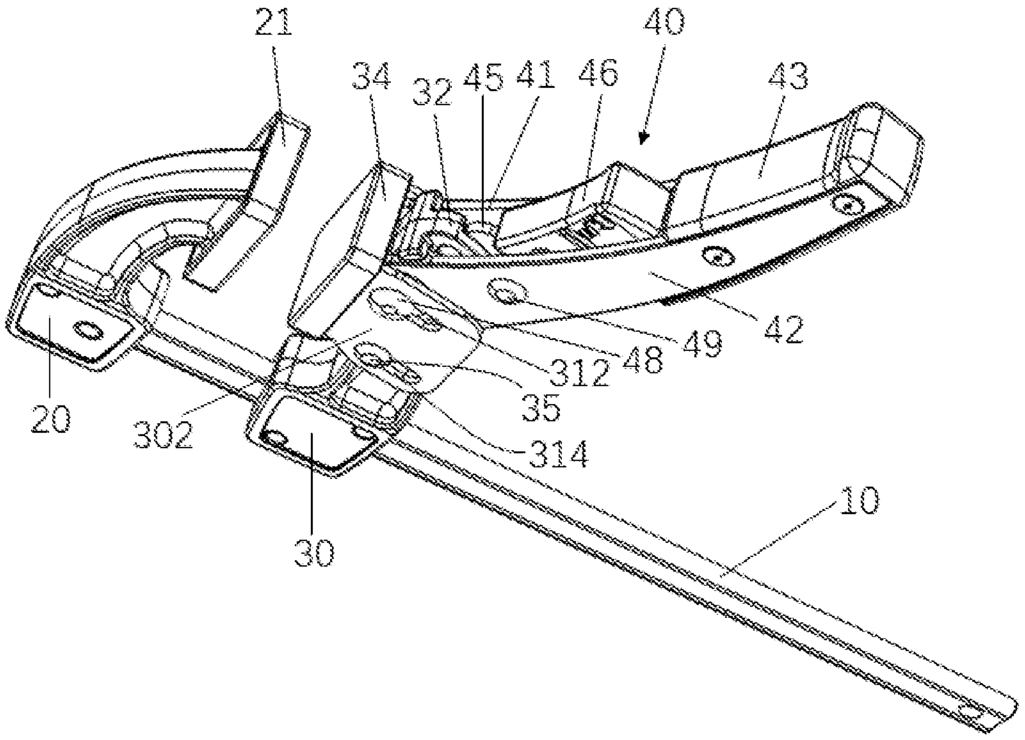
FIG. 2 is an axonometric view of a manual clamp in an assembly state.

As shown in FIG. 1 and FIG. 2, a manual clamp provided in the present application comprises a sliding rod 10, a fixed clamp body 20, a movable clamp body 30 and a control handle 40. The fixed clamp body 20 is fixed at the front end of the sliding rod 10, the movable clamp body 30 is removably connected to the sliding rod 10, and both the fixed clamp body 20 and the movable clamp body 30 extend to the same side of the sliding rod 10, such that the whole F-clamp is in a shape of “F”, which is called F-clamp. One end of the control handle 40 is rotationally connected to the movable clamp body 30. In this embodiment, the sliding rod 10 is slidably sheathed with the movable clamp body 30. In other embodiments, the movable clamp body 30 may also move back and forth on the sliding rod 10 in a rolling or other moving manner through a corresponding connection method.

Figure 3:
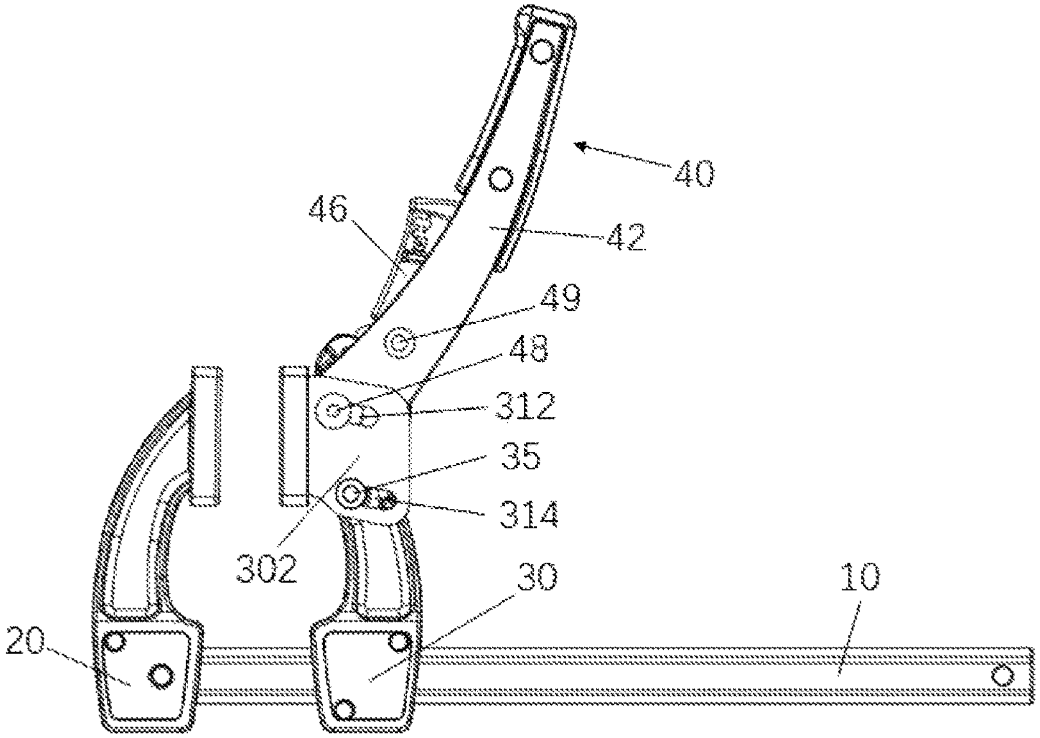
FIG. 3 is a front view of a manual clamp in an unclamping state.

One side of the movable clamp body 30 toward the fixed clamp body 20 is provided with a movable clamp head 31, and the control handle 40 is provided with a cam portion 401. The control handle 40 is operated, that is, the control handle 40 rotates in a direction close to the sliding rod 10, such that the cam portion 401 extrudes the movable clamp head 31, and the movable clamp head 31 moves toward the fixed clamp body 20, so as to achieve clamping with the fixed clamp body 20 (see FIG. 5 and FIG. 6); or the control handle 40 rotates in a direction away from the sliding rod 10, such that the cam portion 401 is away from the movable clamp head 31, and the movable clamp head 31 moves in a direction away from the fixed clamp body 20 to achieve loosening (see FIG. 3 and FIG. 4). In some embodiments, the control handle 40 may be configured such that: the control handle 40 rotates in a direction away from the sliding rod 10, such that the cam portion 401 extrudes the movable clamp head 31 to achieve clamping; or the control handle 40 rotates in a direction close to the sliding rod 10, such that the cam portion 401 is away from the movable clamp head 31 to achieve loosening.

Figure 4:
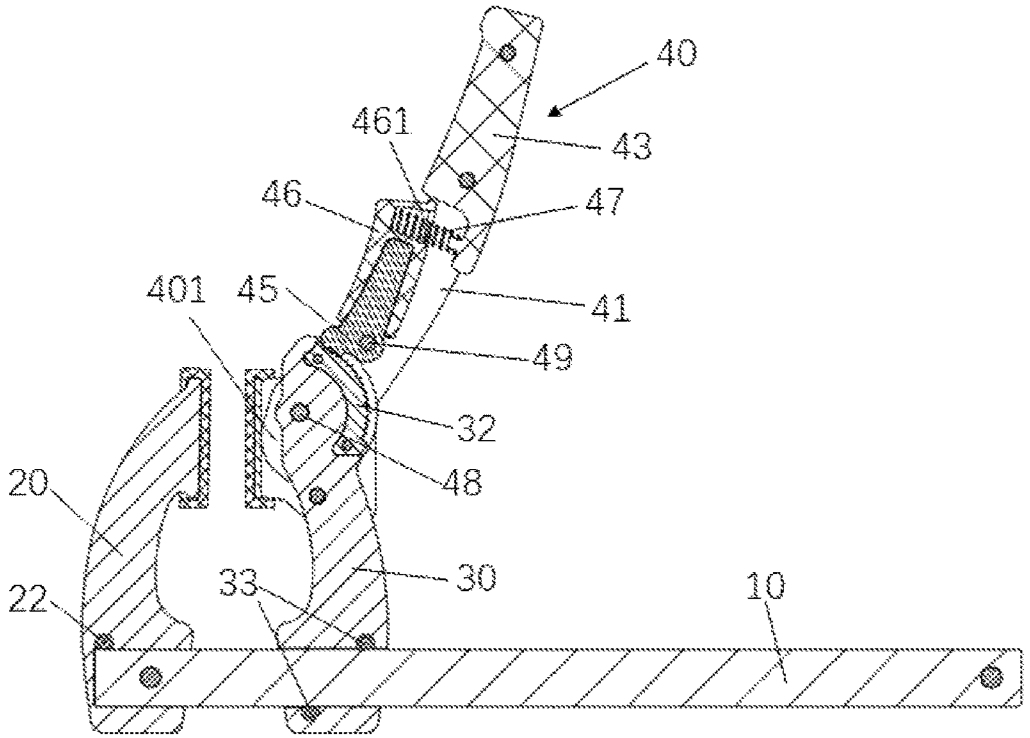
FIG. 4 is a schematic section view of the structure of the FIG. 3.
Figure 6:
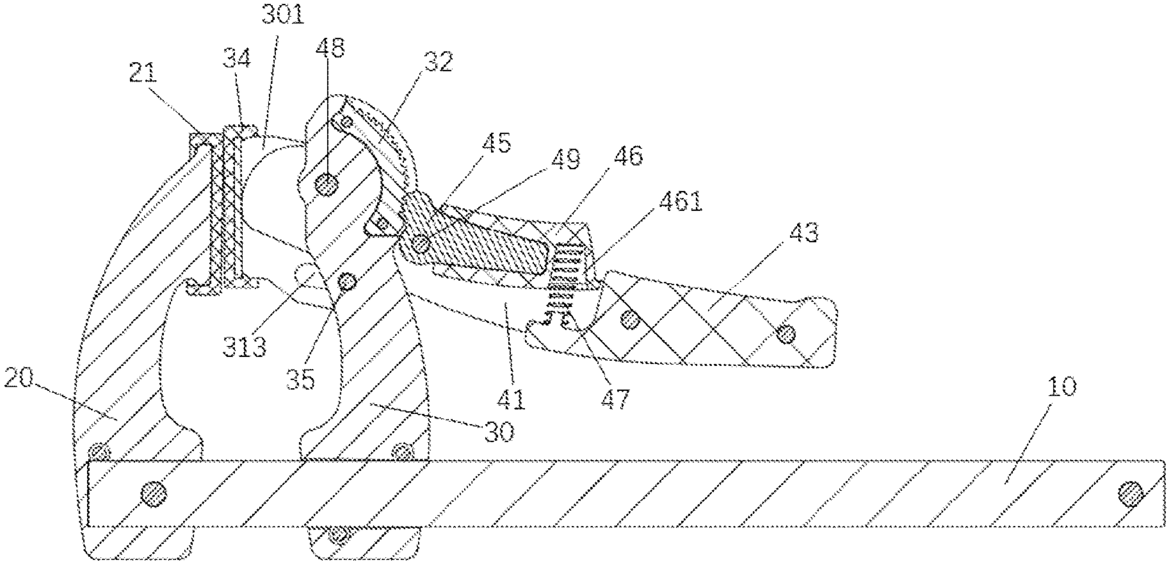
FIG. 6 is a schematic section view of the structure of the FIG. 5.

As shown in FIG. 1 and FIG. 4, the movable clamp body 30 is provided with a ratchet 32, the control handle 40 is provided with a pawl 45, and the ratchet 32 and the pawl 45 can mesh with each other. The control handle 40 is provided with an elastic element 47, and the elastic element 47 exerts an elastic force to the pawl 45, such that the meshing between the pawl 45 and the ratchet 32 is realized. As shown in FIG. 6, the pawl 45 meshes with the ratchet 32 with the elastic force of the elastic element 47 to realize the positioning of the control handle 40, such that the fixed clamp body 20 and the movable clamp body 30 are kept in a clamping state. Preferably, the control handle 40 is provided with a pawl sheath 46, the pawl 45 is sheathed in the pawl sheath 46, and the elastic force of the elastic element 47 is exerted on the pawl sheath 46. The pawl sheath 46 is pressed to overcome the elastic force of the elastic element 47, such that the pawl 45 is out of mesh with the ratchet 32, then the control handle 40 is operated in an opposite direction to release a clamped object. The ratchet 32 and the movable clamp body 30 may be formed integrally. Since the hardness and wear resistance requirements for the ratchet 32 and the movable clamp body 30 are different, it is preferable that the ratchet 32 and the movable clamp body 30 may also be processed by non-integrated processing, that is, the two parts are processed separately, which is convenient for processing and can also reduce the processing cost.

As shown in FIG. 1 and FIG. 2, the control handle 40 comprises a first side plate 41, a second side plate 42 and a reinforcing member 43. The first side plate 41 and the second side plate 42 are oppositely provided and are respectively located on both sides of the movable clamp body 30. The first side plate 41 and the second side plate 42 are connected to the movable clamp body 30 through a first pin shaft 48. As shown in FIG. 1 and FIG. 6, ends of the first side plate 41 and the second side plate 42 that are close to the movable clamp body 30 are both processed into shapes of cams, thus forming cam portions 401. The reinforcing member 43 is provided between the first side plate 41 and the second side plate 42, and is fixed on the two side plates through rivets 44. By using a two side plate type handle structure, it is possible to select side plates and the reinforcing member 43 of different materials to ensure the strength of the control handle 40, for example, the first side plate 41 and the second side plate 42 use steel plates, and the reinforcing member 43 use plastic blocks, thus reducing the processing cost and being convenient for assembly.

As shown in FIG. 2, the first side plate 41, the second side plate 42 and the reinforcing member 43 are enclosed to form a space containing the pawl 45 and the pawl sheath 46. The pawl sheath 46 and the pawl 45 are provided between the first side plate 41 and the second side plate 42, as shown in FIG. 2 and FIG. 6, the pawl 45 is connected to the first side plate 41 and the second side plate 42 through a second pin shaft 49, and can rotate around the second pin shaft 49. The elastic element 47 is preferably a spring, the pawl sheath 46 is provided with a recessed hole 461, the spring is located in the recessed hole 461, one end of the spring is connected to the pawl sheath 46, and the other end is connected to the reinforcing member 43. The elastic element 47 is not limited to a spring, but can also be provided as an elastic piece and other elements that provide elastic forces. When the pawl sheath 46 is not pressed, the pawl sheath 46 is partially protruded outside the control handle 40 under the action of the elastic element 47.

The movable clamp head 31, driven by the cam portion 401, can slide toward the fixed clamp body 20. Preferably, the movable clamp head 31 is a bifurcated component, comprising a first part 301 and a second part 302 provided opposite the first part 301. The first part 301 is provided with a first sliding slot 311, and the second part 302 is provided with a second sliding slot 312. The movable clamp body 30 is provided with a first guide pin passing through the first sliding slot 311 and the second sliding slot 312. The first guide pin can slide along the first sliding slot 311 and the second sliding slot 312. If only a pair of sliding slots, that is, the first sliding slot 311 and the second sliding slot 312, are provided on the movable clamp head 31, the movable clamp head 31 is prone to tilt when clamping. Preferably, another pair of sliding slots, that is, a third sliding slot 313 located in the first part 301 and a fourth sliding slot 314 located in the second part 302, are provided on the movable clamp head 31, and a second guide pin 35 corresponding to the third sliding slot 313 and the fourth sliding slot 314 respectively is provided on the movable clamp body 30. Preferably, to simplify the structure, the first pin shaft 48 used for connecting the control handle 40 can be used as a guide pin, optionally, with the first pin shaft 48 as the first guide pin. As shown FIG. 1 and FIG. 3, the direction of the third sliding slot 313 is substantially same as that of the first sliding slot 311, and the direction of the fourth sliding slot 314 is substantially same as that of the second sliding slot 312. When the movable clamp head 31 is sliding, due to the limitation of the four sliding slots, tilting of the movable clamp head 31 will not occur when clamping, thus ensuring uniform forces exerted on the clamped object.

The fixed clamp body 20 is fixedly mounted on the sliding rod 10 through the first pin 22. In order to avoid the damage caused by deformation of the fixed clamp body 20 when an object is clamped, preferably, the fixed clamp body 20 is also equipped with a second pin 23. When the object is clamped, the second pin 23 comes into contact with the sliding rod 10 to avoid the deformation of the fixed clamp body 20.

Figure 7:
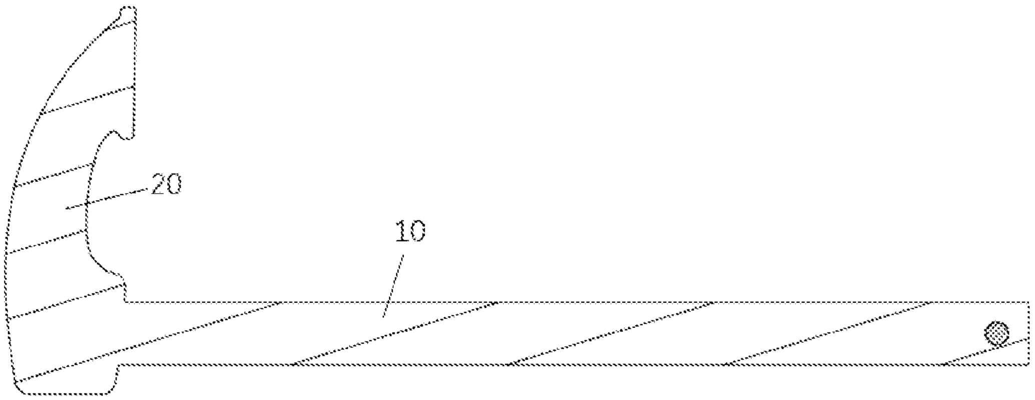
FIG. 7 is a schematic section view of a structure of a fixed clamp body and a sliding rod which are formed integrally in an embodiment.

As shown in FIG. 7, the fixed clamp body 20 and the sliding rod 10 may also be formed integrally.

As shown in FIG. 1 and FIG. 4, the movable clamp body 30 is connected to the sliding rod 10 through two positioning pins 33. When clamping, the two positioning pins 33 come into contact with the sliding rod 10 to fix the movable clamp body 30.

In order to prevent the clamped object from being damaged, the fixed clamp body 20 is provided with a first sheath 21, the movable clamp head 31 is provided with a second sheath 34, and the first sheath 21 and the second sheath 34 also be in pad forms.

In order to prevent the movable clamp body 30 from being disengaged from the sliding rod 10 when sliding along a direction away from the fixed clamp body 20, a limit pin 11 is provided at an end of the sliding rod 10 opposite the fixed clamp body 20.

Figure 5:
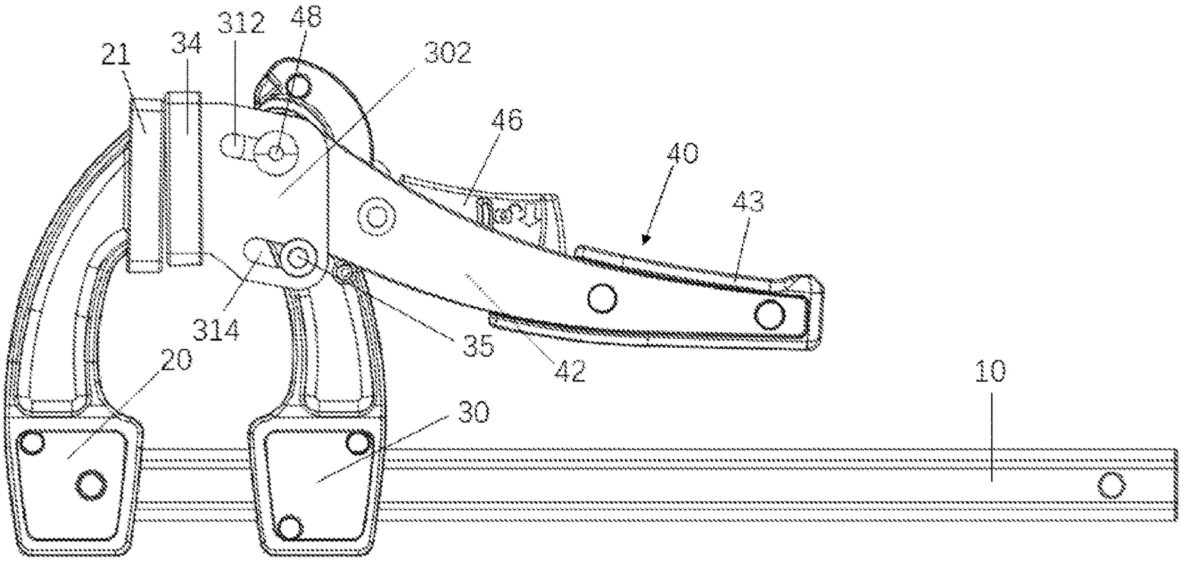
FIG. 5 is a front view of a manual clamp in a clamping state.

With regard to the F-clamp of the present application, when an object is to be clamped, the fixed clamp body 20 and the movable clamp head 31 are aligned with the object and come into contact with the object by sliding the movable clamp body 30, and then they are maintained in an appropriate clamping position. The control handle 40 is pulled toward the sliding rod 10, such that the cam portion 401 extrudes the movable clamp head 31, which can realize clamping (as shown in FIG. 5 and FIG. 6) once from the state shown in FIG. 3 and FIG. 4. During the process of pulling the control handle 40, the pawl 45 runs across the ratchet 32. When clamping, the pawl 45 is positioned on the ratchet 32, and the elastic force exerted by the elastic element 47 on the pawl 45 prevent the pawl 45 from being disengaged from the ratchet tooth, such that the control handle 40 cannot be operated in a reverse direction. When it is necessary to release the clamping, the ratchet sheath is pressed to overcome the elastic force of the elastic element 47, such that the pawl 45 is out of mesh with the ratchet 32. The control handle 40 is pulled away from the sliding rod 10 to reach the state shown in FIG. 3 and FIG. 4 from the state shown in FIG. 5 and FIG. 6, so that the cam portion 401 is away from the movable clamp head 31, which can realize loosening, releasing the clamped object, and sliding the movable clamp body 30 to leave the clamped object.

The preferred and specific embodiments of the present application are described in detail above. It should be understood that those of ordinary skills in the art may make many modifications and changes according to the concept of the present application without creative work. Therefore, all technical solutions that can be obtained by those skilled in the art through logical analysis, reasoning or limited experiments based on the concept of the present application and the prior art should fall within the scope of protection defined by the claims.

The invention claimed is:

1. A manual clamp, comprising:

a sliding rod;

a fixed clamp body which is fixedly connected to one end of the sliding rod;

a movable clamp body which is removably connected to the sliding rod;

a movable clamp head which is removably connected to the movable clamp body;

a handle which is rotationally connected to the movable clamp body, wherein the handle comprises a first side plate and a second side plate which are oppositely provided, and one end of the first side plate that is close to the movable clamp body and one end of the second side plate that is close to the movable clamp body are both processed into shapes of cams to form a cam portion which is configured to come into contact with or disengage from the movable clamp head by operating the handle, and the cam portion being further configured to exert a driving force to the movable clamp head through the contact with the movable clamp head, thus being able to drive the movable clamp head to move toward the fixed clamp body to realize clamping; and a locking device which is configured to fix a position of the handle when clamping.

2. The manual clamp of claim 1, wherein the locking device comprises:

a ratchet which is provided on the movable clamp body;

a pawl which is matched with the ratchet and is provided on the handle;

an elastic element which is configured to exert an elastic force to the pawl, such that the pawl meshes with the ratchet; and an unlocking component which is configured to be operated to overcome the elastic force of the elastic element, such that the pawl is out of mesh with the ratchet.

3. The manual clamp of claim 2, wherein the handle comprises a first side plate and a second side plate which are oppositely provided, and a reinforcing member fixed between the first side plate and the second side plate, wherein the reinforcing member is arranged on one end of the handle away from the movable clamp head; and the first side plate and the second side plate are respectively located on both sides of the movable clamp body and are connected to the movable clamp body through a first pin shaft.

4. The manual clamp of claim 3, wherein the pawl is provided within a space enclosed by the first side plate, the second side plate and the reinforcing member, and the pawl is connected to the first side plate and the second side plate through a second pin shaft.

5. The manual clamp of claim 4, wherein the unlocking component comprises a pawl sheath fixedly connected to the pawl, and the elastic element is configured to exert an elastic force to the pawl sheath.

6. The manual clamp of claim 5, wherein at least a part of the pawl sheath is located outside the handle.

7. The manual clamp of claim 5, wherein the elastic element comprises a spring.

8. The manual clamp of claim 7, wherein the pawl sheath is provided with a recessed hole, the spring is located in the recessed hole, one end of the spring is connected to the pawl sheath, and the other end of the spring is connected to the reinforcing member.

9. The manual clamp of claim 2, wherein the ratchet and the movable clamp body are formed integrally.

10. The manual clamp of claim 2, wherein the ratchet is independent of the movable clamp body, and the ratchet is fixedly mounted on the movable clamp body.

11. The manual clamp of claim 1, wherein the movable clamp head comprises a first part and a second part which are symmetrically provided and at least one pair of sliding slots, wherein the at least one pair of sliding slots are respectively provided on the first part and the second part, and a guide pin on the movable clamp body is sheathed in the at least one pair of sliding slots respectively.

12. The manual clamp of claim 11, wherein the movable clamp head is provided with two pairs of the sliding slots, and at least two of the guide pins on the movable clamp body are sheathed in the two pairs of sliding slots respectively, wherein a length direction of each slot of the two pairs of sliding slots is substantially parallel to a moving direction of the movable clamp head.

13. The manual clamp of claim 1, wherein the movable clamp body is provided with two positioning pins, and the two positioning pins are configured to come into contact with the sliding rod when clamping.

14. The manual clamp of claim 1, wherein the fixed clamp body is fixed on the sliding rod through a first pin.

15. The manual clamp of claim 14, wherein the fixed clamp body is also provided with a second pin, and the second pin comes into contact with the sliding rod when clamping.

16. The manual clamp of claim 1, wherein the fixed clamp body and the sliding rod are formed integrally.

17. The manual clamp of claim 1, wherein a limit pin is provided at the other end, away from the fixed clamp body, of the sliding rod.

18. The manual clamp of claim 1, wherein the fixed clamp body is provided with a first sheath, and/or the movable clamp head is provided with a second sheath.

19. A manual clamp, comprising:

a sliding rod;

a fixed clamp body which is fixedly connected to one end of the sliding rod;

a movable clamp body which is removably connected to the sliding rod;

a movable clamp head which is removably connected to the movable clamp body;

a handle which is rotationally connected to the movable clamp body, wherein the handle comprises a first side plate and a second side plate which are oppositely provided, and a reinforcing member fixed between the first side plate and the second side plate, wherein the reinforcing member is arranged on one end of the handle away from the movable clamp head, and the first side plate and the second side plate are respectively located on both sides of the movable clamp body and are connected to the movable clamp body through a first pin shaft, one end of the first side plate that is close to the movable clamp body and one end of the second side plate that is close to the movable clamp body are both processed into shapes of cams to form a cam portion which is configured to come into contact with or disengage from the movable clamp head by operating the handle, and the cam portion being further configured to exert a driving force to the movable clamp head through the contact with the movable clamp head, thus being able to drive the movable clamp head to move toward the fixed clamp body to realize clamping;

a ratchet which is provided on the movable clamp body;

a pawl which is matched with the ratchet and is rotationally provided between the first side plate and the second side plate;

an elastic element which is configured to exert an elastic force to the pawl, such that the pawl meshes with the ratchet; and a pawl sheath which is connected to the pawl and is configured to be operated to overcome the elastic force of the elastic element, such that the pawl is out of mesh with the ratchet.

20. The manual clamp of claim 19, wherein the movable clamp head comprises a first part and a second part which are oppositely provided and at least two pairs of sliding slots, wherein the at least two pairs of sliding slots are respectively provided on the first part and the second part, and at least two guide pins on the movable clamp body are sheathed in the at least two pairs of sliding slots respectively.

* * * * *